Dec. 8, 1970   H. R. HADLEY ET AL   3,545,263
COMPRESSION TESTING MACHINE
Filed Jan. 21, 1969                    2 Sheets-Sheet 1

INVENTORS
HERBERT ROY HADLEY & DENIS KAYE
BY Norris & Bateman 3,545,263
COMPRESSION TESTING MACHINE
Herbert Roy Hadley, Harrowgate, and Denis Kaye, Leeds, England, assignors to Saml. Denison & Son Limited, Leeds, England, a British company
Filed Jan. 21, 1969, Ser. No. 792,627
Claims priority, application Great Britain, Jan. 26, 1968, 4,106/68
Int. Cl. G01n 3/08
U.S. Cl. 73—94         13 Claims

ABSTRACT OF THE DISCLOSURE

A physical testing machine especially for compression testing wherein one of a pair of relatively movable platens has a ball-joint engagement with a bearing member for permitting limited angular adjustment of the platen, including releasable means for locking the platen relative to the bearing member in any of its angular positions.

---

This invention relates to physical testing machines of the kind having a platen mounted in ball-joint engagement with a bearing member so as to permit adjustment of the platen to present a working face in contacting alignment with a test-piece.

Machines of the above kind usually rely upon frictional restraint between the platen and the bearing member to hold the platen in position whilst a test-piece is compressed against the platen. It has been found that this arrangement has the disadvantage that some movement of the platen relative to the bearing can occur during testing and an object of this invention is to provide a machine of the above kind which overcomes this disadvantage.

In accordance with this invention, a physical testing machine includes a bearing member and a platen having part-spherical surfaces in ball-joint engagement with one another permitting limited angular adjustment of the platen relative to the member, and releasable means serving to lock the platen relative to the bearing member in any one angular adjustment position.

Figure 1:
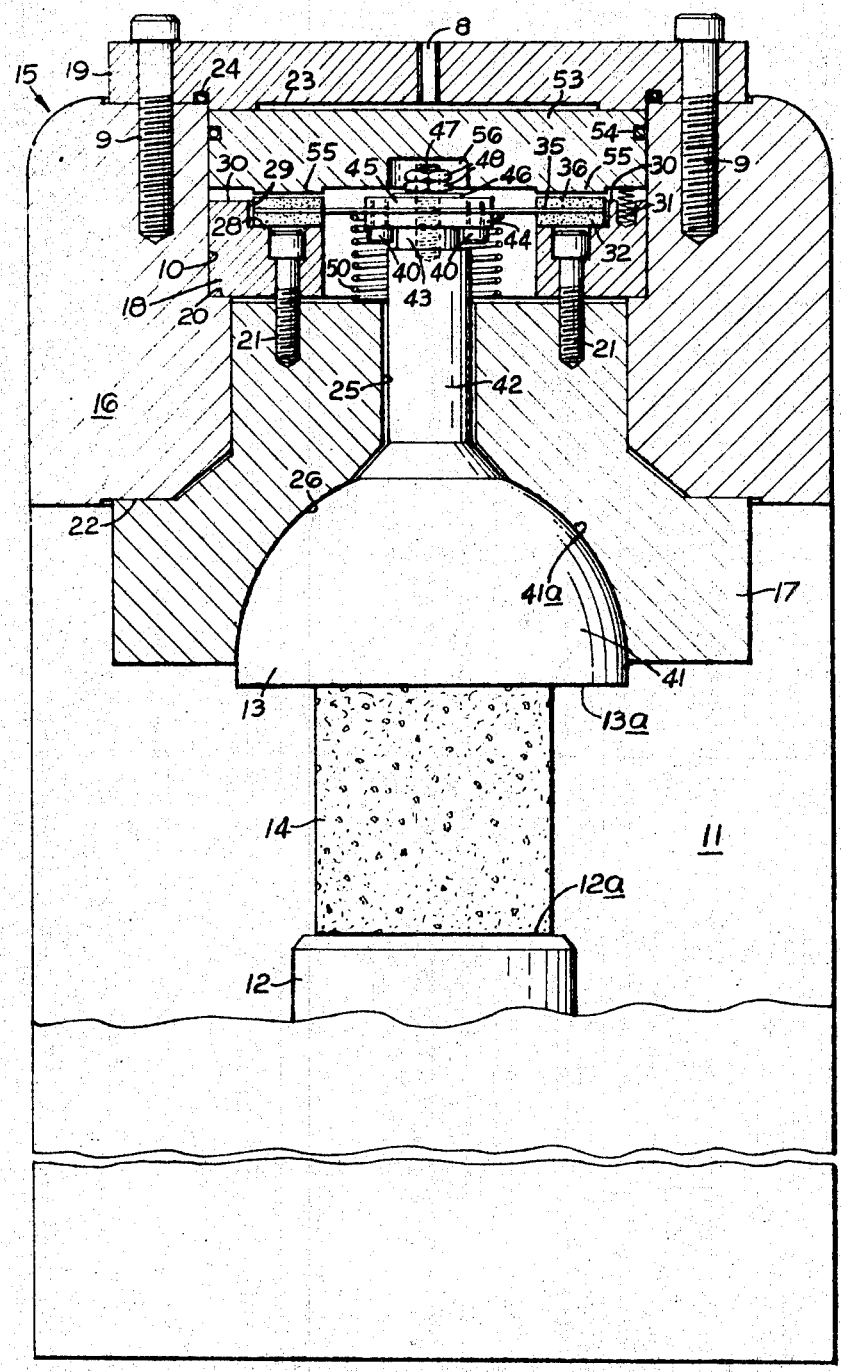
Figure 2:
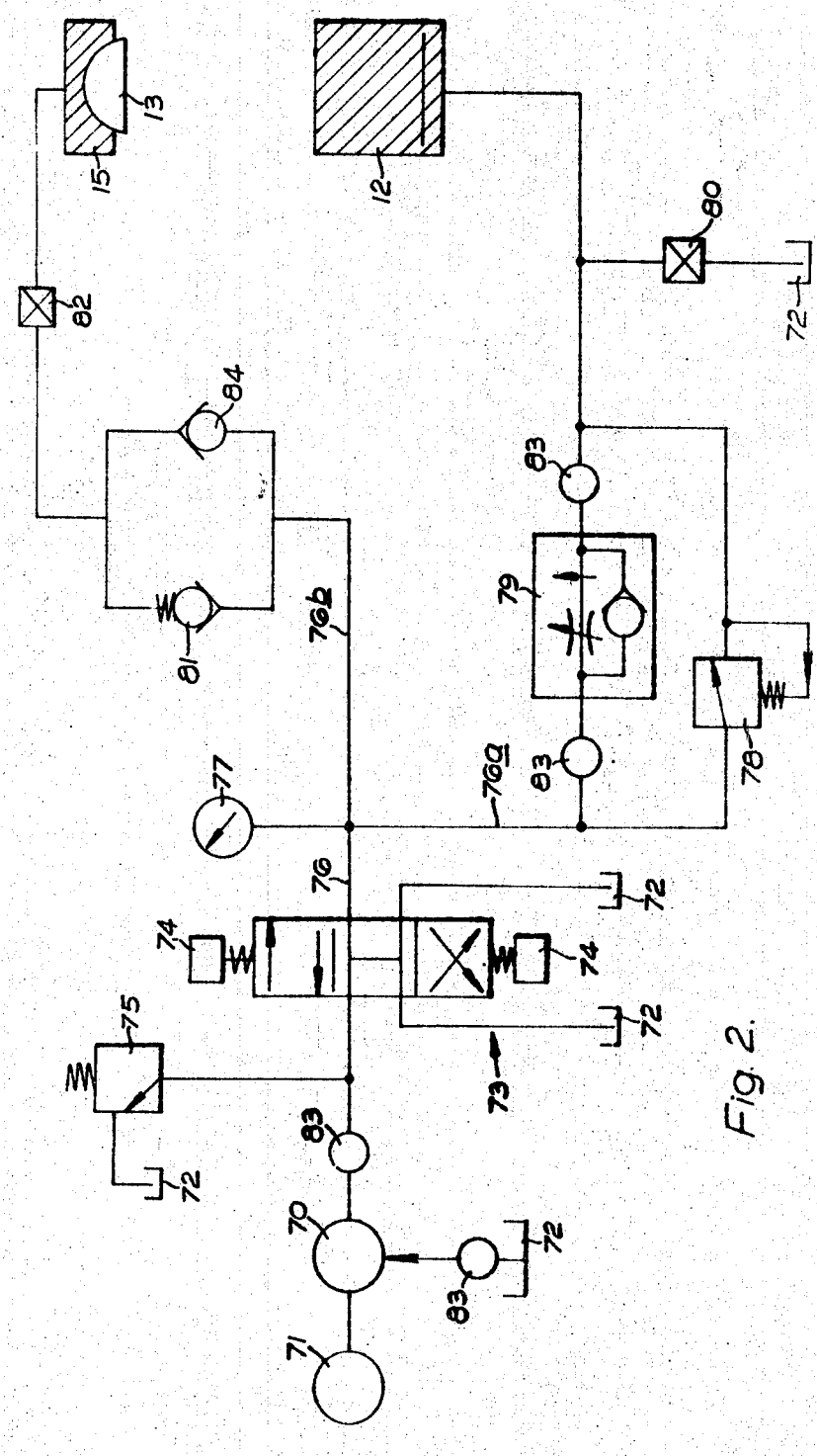

A preferred example of the invention is more particularly described with reference to the accompanying drawings, wherein:

FIG. 1 is a sectional elevation of part of a physical testing machine according to the invention, showing upper and lower platens with a test-piece therebetween; and FIG. 2 is a diagrammatic representation of a hydraulic circuit of the machine.

Referring initially to FIG. 1, the physical testing machine shown is designed for testing concrete blocks by compression. The machine includes a frame 11 mounting a lower platen 12 and an upper platen 13, the latter being capable of being locked in a position fixed relative to the frame (as described hereafter) and the lower platen forming part of (or being mounted on) a vertically reciprocable hydraulic ram in conventional manner so as to crush a testpiece 14 between working faces 13a, 12a of the platens.

The frame 11 carries a housing 15 having a body 16 provided with a circular-section internal wall 10 defining an axially vertical aperture, and a cover plate 19 bolted to the body at 9 to close an upper end of the aperture. A control passage 8 is provided through the plate and connects with a shallow depression 23 in a lower face of the cover plate within the body aperture. An O-ring 24 seals the cover plate to the body. The cover plate is fixed in position after mounting of the upper platen and a locking device therefor within the body aperture.

The locking device includes a bearing member 17 and an annulus 18 mounted in the body aperture, the aperture wall 10 being stepped to define a shoulder 20 on which the annulus seats. The annulus is bolted to the bearing member at 21 within the aperture so as to clamp the bearing member against a lower face 22 of the housing. The bearing member 17 has a central aperture with a cylindrical wall 25 opening into a recess defined by a hemi-spherical bearing surface 26.

The annulus 18 has an annular rebate, defined by an annular shoulder 28 and a peripheral wall 29, in a face 30 remote from the bearing member. A plurality of holes spaced around the margin of the face 30 receive helical springs 31 normally projecting out of the holes.

A flexible metal diaphragm 35 is disposed between a pair of pads composed of high friction material and in the form of friction rings 32 and 36. The diaphragm is normally out of contact with the peripheral wall 29 so as to permit limited radial movement of the diaphragm.

The upper platen 13 has a solid hemi-spherical part 41 provided with the working face 13a. The hemi-spherical part has a wall 41a complementary to the hemi-spherical bearing surface 26 of the bearing member so as to define a ball-joint therewith. A spigot 42 extends perpendicularly from the crown of the hemi-spherical part 41 through the bearing member aperture out of contact with the wall 25 of the latter. The spigot 42 has near its upper end a reduced thickness portion 43 which slidably receives a pair of clamping rings 44, 45 and the diaphragm 35. The diaphragm is clamped between the rings 44, 45 by bolts. The washer 46 is mounted on the end of the spigot by a screwed pin 47 and lock-nuts 48 on the pin. A helical compression spring 50 is mounted about the spigot between the upper end of the bearing member 17 and the diaphragm 35 so as to lift the latter.

The upper platen 13 is, therefore, suspended by means of its diaphragm, the compression spring 50 serving to support the diaphragm and being of sufficient strength to hold the hemi-spherical bearing surfaces of the ball joint in mutual contact, and the spring also centralises the diaphragm and the upper platen.

A piston 53 is slidably mounted in the housing aperture between the annulus 18 and the cover plate 19, with an O-ring 54 forming a seal between the piston 53 and aperture wall 10. The underface of the piston has an annular projection 55, in register with the underlying friction ring 36. A plurality of helical springs 31 are carried by the annulus 18 and bear against the margin of the piston surrounding the annular projection 55 so as to lift the piston into abutment with the cover plate. A recess 56 in the piston receives the lock-nuts 48 and the pin 47 projecting above the friction ring 36.

The upper platen 13 is angularly movable by virtue of its ball-joint engagement in the bearing member in any angular direction to an extent permitted by the radial clearances provided between the spigot 42 and the bearing member wall 25 and between the diaphragm 35 and the recess peripheral wall 29. Hence the working face 13a of the upper platen can lie horizontally as shown in FIG. 1 or may be slightly offset from the horizontal in any angular direction.

The hydraulic system provided to supply liquid under pressure to the hydraulic ram is adapted also to control the locking device.

The hydraulic system is diagrammatically illustrated in FIG. 2 and shows a pump 70 operated by an electric motor 71 and connected with a hydraulic liquid reservoir 72. The pump connects with a control valve 73 operated by solenoids 74. An adjustable relief valve 75 is connected between the pump and the valve 73. The control valve 73 can be set to connect the pump with the reservoir 72 for recirculation of hydraulic liquid from the reservoir through the pump and the control valve and back to the reservoir or alternatively can be set to connect the pump with an outlet line 76 having branches 76a and 76b. A pressure gauge 77 is provided in the outlet line 76.

The branch 76a is connected with the ram constituting the lower platen 12 through a sequence valve 78 which is open at low hydraulic pressure but closes at a predetermined level (for example 70 p.s.i.) when the pressure increases. In parallel with the sequence valve is a pressure compensated flow control valve 79, normally adjustable to provide a required flow rate of hydraulic liquid to the lower platen 12 with the sequence valve 78 closed. A dump valve 80 is provided between the lower platen 12 and the valves 78, 79 and connects with the reservoir 72.

The branch 76b is connected with the port 8 (not shown in FIG. 2) in the housing 15 of the upper platen 13 through a non-return valve 81 permitting flow only in a direction towards the upper platen 13 with the pressure exceeding a given value. A stop valve 82 is provided between the upper platen and the non-return valve 81 and in parallel with the latter is connected a one-way check valve 84 acting in the opposite direction to the non-return valve 81. Filters 83 are incorporated in the system at numerous positions to prevent choking of the valves by solid matter.

To initiate a compression test on a test-piece 14, the pump is initially set in operation to circulate liquid through the control valve 73, the relief valve 75 is set to determine the required maximum pressure to be applied to the test-piece and the dump valve 80 is closed. The control valve is then set to prevent recirculation whereby hydraulic fluid is pumped into the line 76 so as to load the ram with liquid passing freely through the sequence valve 78. The ram rises and urges the test-piece against the upper platen 13, so as to tilt the latter in its bearing to align with the contacting face of the test-piece, tilting being permited by radial movement of the diaphragm 35. As the lower platen compresses the test-piece against the upper platen, hydraulic pressure rises until, at the predetermined level the sequence valve 78 closes. Hydraulic liquid is then metered to the ram by the pressure compensated flow control valve 70 at a predetermined rate.

Closure of the sequence valve 78 causes a rapid increase in pressure in the system before the sequence valve until pressure reaches and is maintained at a given level determined by the setting of the relief valve 75. The increase in pressure causes the non-return valve 81 to open, whereby the pressure is transmitted to the piston 53 through the passage 8 and the shallow recess 23 in the cover plate 19 (the stop valve 82 being open). The piston is thereby depressed against the action of the helical springs 31 so as to clamp the friction rings 32, 36 with the diaphragm 35 against the annular face 18 whereby the upper platen 13 is locked in the tilted position. The non-return valve 81 serves to delay locking of the upper platen 13 until the latter has been aligned with the test-piece. Hydraulic liquid continues to be metered to the ram until eventually the test-piece fails or the maximum pressure permitted by the relief valve 75 is exerted on the test-piece.

The stop valve 82 is included so that the locking device can be prevented from operating, if desired, by preventing hydraulic liquid flow to the piston 53.

To release hydraulic pressure after testing, the dump valve 80 is opened so that hydraulic liquid is returned to the reservoir under the weight of the ram. The control valve 73 is also set to a recirculating position wherein pressure is relieved from other parts of the system, the springs 31 acting on the piston 53 serving to return the piston to a non-locking position and to urge hydraulic fluid back through the control valve to the reservoir. The working face of the upper platen returns to a horizontal position under the action of compression.

The positive locking of the upper platen provides improved testing performance, particularly in compression testing of concrete cubes.

It is envisaged that the piston could be actuated by other means than the hydraulic system described above; for example, the piston could be replaced by a screw-operated press which could be either mechanically or electro-mechanically operated.

What is claimed is:

1. A physical testing machine including a bearing member and a platen having part-spherical surfaces in ball-joint engagement with one another permitting limited angular adjustment of the platen relative to the member, the platen having an extension from its part-spherical surface which projects through an aperture defined by the bearing member; and releasable means acting at a position spaced from the spherical surface by the extension and serving to lock the platen relative to the bearing member in any one angular adjustment position within a range afforded by said limited angular adjustment.

2. A machine according to claim 1, characterised by a transverse diaphragm mounted on the extension, and the releasable means serving to clamp said diaphragm to said bearing member for said platen.

3. A machine according to claim 2, characterised in that said releasable means includes a piston reciprocable to clamp and release said diaphragm.

4. A machine according to claim 3, characterised in that said piston is normally spring-urged into diaphragm release position.

5. A machine according to claim 3 characterised by a pair of high friction pads on the diaphragm in the region clamped between the piston and bearing member.

6. A machine according to claim 3 characterised by a hydraulic system in circuit with said piston and operable to urge the piston into clamping position against the diaphragm.

7. A machine according to claim 6 including a ram with which said hydraulic system also has connection and which is reciprocable relative to said platen to compress a test-piece located between the ram and the platen in use.

8. A machine according to claim 7 characterised in that said hydraulic system includes a valve serving to limit hydraulic pressure application to the piston until the pressure exerted by the ram exceeds a given value.

9. A machine according to claim 1, characterised in that means is provided for resiliently urging said part-spherical surfaces into engagement with one another.

10. A machine according to claim 9, said resilient means comprising a coil spring surrounding the extension and acting between the diaphragm and said bearing member.

11. A compression testing machine comprising a bearing member and a platen having part-spherical surfaces in ball joint engagement providing for limited angular adjustment of the platen relative to the bearing member, shiftable means flexibly supporting said platen on said bearing member and urging said surfaces into engagement while permitting such adjustment during alignment of said platen with a specimen to be tested, and means for clamping said supporting means to said bearing member in any adjusted position of said platen for locking the platen in that position.

12. The compression testing machine defined in claim 11, wherein said shiftable flexible support means comprises a flexible diaphragm transversely shiftably mounted on said bearing member, and said clamping means comprises a hydraulic piston adapted to clamp said diaphragm to said bearing member.

13. The compression testing means defined in claim 11, said clamping means comprising a hydraulic piston, means defining a circuit connected to said system for supplying fluid under pressure to displace said piston to lock said platen, and means in said circuit for preventing said piston from locking said platen until said platen has adjusted to alignment with the specimen.

References Cited

UNITED STATES PATENTS 3,320,798   5/1967   Gram _____ 73—103

JERRY W. MYRACLE, Primary Examiner

U.S. Cl. X.R.

73—103; 308—2